United States Patent
Johnson et al.

(10) Patent No.: US 9,046,134 B2
(45) Date of Patent: Jun. 2, 2015

(54) STEERING GEAR CLUTCH

(71) Applicant: TRW Automotive U.S. LLC, Livonia, MI (US)

(72) Inventors: James R. Johnson, Lafayette, IN (US); Kevin E. Boyle, Bradenton, FL (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 13/832,981

(22) Filed: Mar. 15, 2013

(65) Prior Publication Data

US 2014/0274421 A1 Sep. 18, 2014

(51) Int. Cl.
F16D 7/08 (2006.01)
F16D 3/10 (2006.01)
F16D 7/04 (2006.01)
B62D 7/14 (2006.01)
B62D 7/15 (2006.01)

(52) U.S. Cl.
CPC ............. F16D 3/10 (2013.01); F16D 7/044 (2013.01); B62D 7/14 (2013.01); B62D 7/1527 (2013.01)

(58) Field of Classification Search
USPC .............. 464/38, 39, 160, 161; 180/409, 410, 180/445; 192/55.1, 56.1, 56.6–56.62
See application file for complete search history.

(56) References Cited

U.S. PATENT DOCUMENTS

| 363,635 | A | * | 5/1887 | Henrichsen | ............... 464/160 X |
| 4,062,203 | A | * | 12/1977 | Leonard et al. | ................. 464/38 |
| 5,681,222 | A | * | 10/1997 | Hansen et al. | ................ 464/160 |
| 6,945,350 | B2 | | 9/2005 | Szabela et al. | |

* cited by examiner

*Primary Examiner* — Gregory Binda
(74) *Attorney, Agent, or Firm* — Tarolli, Sundheim, Covell & Tummino LLP

(57) ABSTRACT

A steering gear clutch includes a housing and an input shaft rotatably supported by the housing. An output shaft operatively connected with a steering gear is rotatably supported by the housing. The output shaft is rotatable relative to the input shaft. The input shaft rotates together with the output shaft relative to the housing when a torque below a predetermined value is applied to the input shaft. The input shaft rotates relative to the output shaft and the housing when a torque above the predetermined value is applied to the input shaft. The input shaft may rotate relative to a shaft portion of the output shaft and the housing through a predetermined angle. The input shaft and the shaft portion may rotate together relative to the housing when the input shaft has rotated through the predetermined angle.

6 Claims, 3 Drawing Sheets

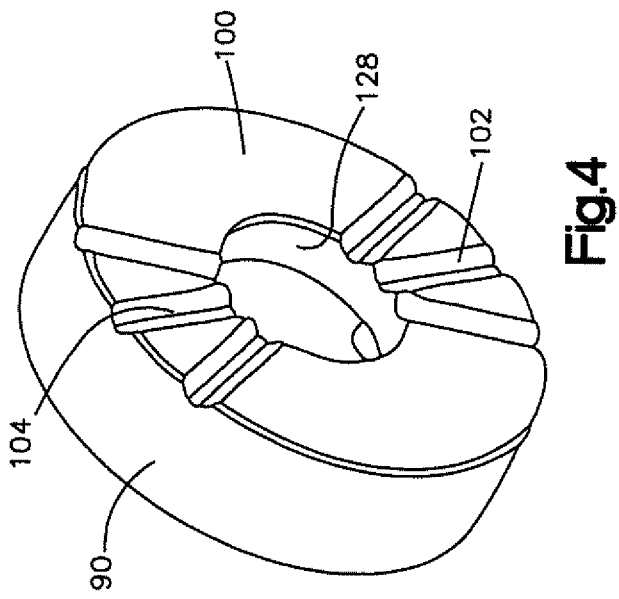
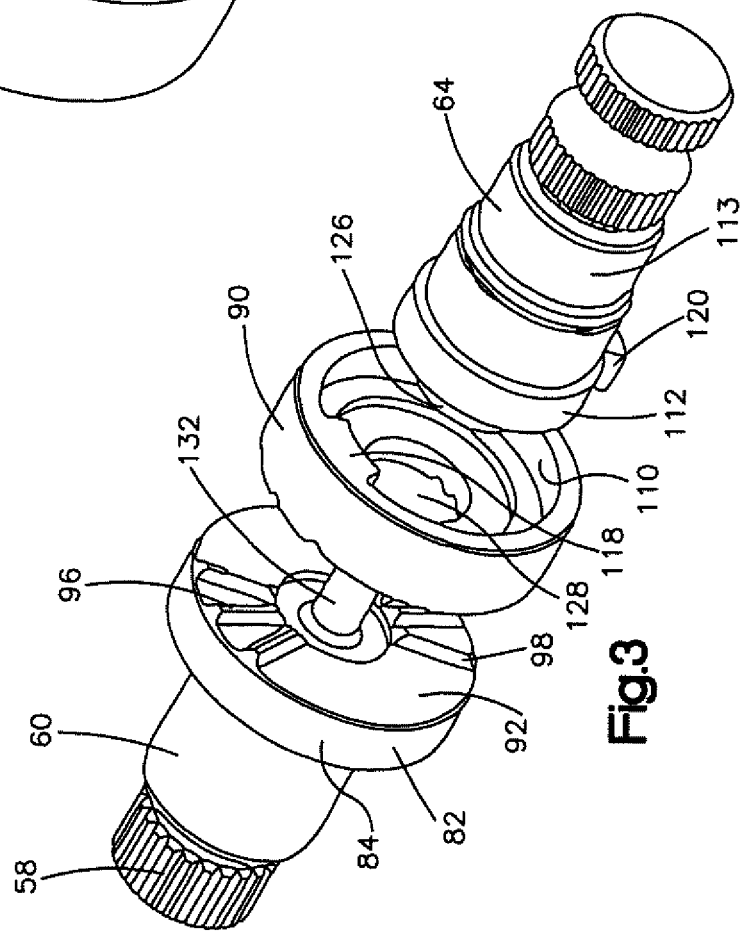

STEERING GEAR CLUTCH

TECHNICAL FIELD

The present invention relates to a steering apparatus for use in turning rear steerable wheels of a vehicle, and more specifically, to a steering gear clutch for use in the a steering apparatus for turning rear steerable wheels.

BACKGROUND OF THE INVENTION

A known steering apparatus for turning rear steerable wheels of a vehicle includes a steering gear actuatable in response to turning of a steering wheel. The steering apparatus includes a shaft extending from a steering gear connected to a front steering linkage to a steering gear connected to a rear steering linkage. The shaft rotates in response to turning of the steering wheel to actuate the rear steering gear and turn the rear steerable wheels.

SUMMARY OF THE INVENTION

The present invention relates to a steering gear clutch including a housing and an input shaft rotatably supported by the housing. An output shaft operatively connected with a steering gear is rotatably supported by the housing. The output shaft is rotatable relative to the input shaft. The input shaft rotates together with the output shaft relative to the housing when a torque below a predetermined value is applied to the input shaft. The input shaft rotates relative to the output shaft and the housing when a torque above the predetermined value is applied to the input shaft.

In another aspect of the present invention a steering gear clutch includes a housing. An input shaft is rotatably supported by the housing and operatively connected to a first steering gear. An output shaft has a shaft portion operatively connected to a second steering gear. The shaft portion is rotatably supported by the housing. The shaft portion is rotatable relative to the input shaft. The input shaft rotates relative to the shaft portion and the housing through a predetermined angle. The input shaft and the shaft portion rotate together relative to the housing when the input shaft has rotated relative to the housing through the predetermined angle.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 is a schematic exploded pictorial view of the steering gear clutch of FIG. 2; and FIG. 4 is a pictorial view of a dog disk of the steering gear clutch of FIG. 3.

DETAILED DESCRIPTION OF AN EXEMPLARY EMBODIMENT

Figure 1:
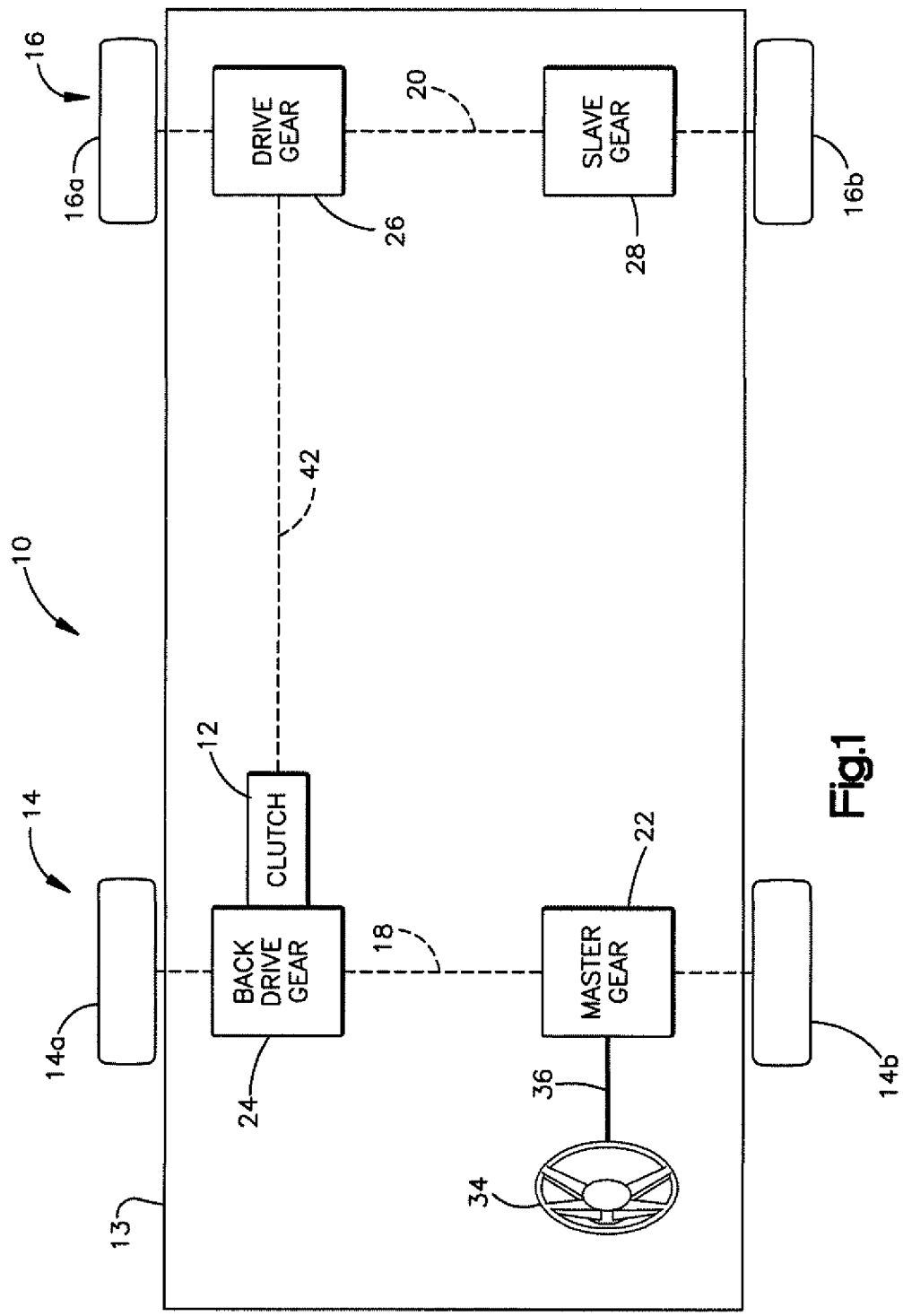
FIG. 1 is a schematic block diagram illustrating a steering apparatus with a steering gear clutch constructed in accordance with the present invention.

FIG. 1 is a schematic block diagram illustrating a steering apparatus 10 having a steering gear clutch 12 constructed in accordance with the present invention. The steering apparatus 10 is mounted to a vehicle 13 having a front set 14 of steerable wheels and a rear set 16 of steerable wheels. The front set 14 of steerable wheels includes wheels 14a and 14b and the rear set 16 of steerable wheels includes wheels 16a and 16b. Wheels 14a and 14b are mounted on opposite ends of a front steering linkage 18 in a manner such that movement of the front steering linkage results in turning of wheels 14a and 14b to turn the vehicle 13. Likewise, wheels 16a and 16b are mounted on opposite ends of a rear steering linkage 20 in a manner such that movement of the rear steering linkage results in turning of wheels 16a and 16b.

The steering apparatus 10 includes a first or master steering gear 22 and a second or back drive gear 24. The first and second gears 22 and 24 are operatively connected to the front steering linkage 18 in a known manner. The steering apparatus 10 also includes a third or drive gear 26 and a fourth or slave gear 28. The third and fourth gears 26 and 28 are operatively connected to the rear steering linkage 20 in a known manner. Preferably, the first, second, third and fourth gears 22, 24, 26 and 28 are integral steering gears. An exemplary integral steering gear that may be used is described in U.S. Pat. No. 6,945,350.

The first or master steering gear 22 is actuatable in response to rotation of a vehicle steering wheel 34 to effect movement of the front steering linkage 18 to turn the front set 14 of steerable wheels. An input shaft 36 of the first steering gear 22 may be operatively connected to the steering wheel 34 in a known manner. Alternatively, the input shaft 36 of the first steering gear 22 may be actuated by an electric motor (not shown) that is responsive to operator-applied steering inputs to the steering wheel 34.

The second or back drive gear 24 is also actuatable in response to rotation of the vehicle steering wheel 34. A sector gear (not shown) of the second gear 24 rotates in response to rotation of the steering wheel 34 in a known manner. An output shaft (not shown) of the second gear 24 rotates in response to rotation of the sector gear in a known manner.

The clutch 12 may transmit rotation of the output shaft of the second gear 24 to a shaft 42 operatively connected to the third or drive gear 26 when in an engaged condition. The clutch 12 does not transmit rotation of the output shaft of the second gear 24 to the shaft 42 when in a disengaged condition. The clutch 12 may be connected to a housing of the second gear 24. It is contemplated that the clutch 12 may be connected to a frame of the vehicle or the housing of the third or drive gear 26.

The third or drive gear 26 is actuatable in response to rotation of the shaft 42 to effect movement of the rear steering linkage 20 to turn the rear set 16 of steerable wheels. The fourth or slave gear 28 is also actuatable in response to rotation of the shaft 42.

The steering gear clutch 12 may transmit rotation of the output shaft of the second gear 24 to the third gear 28 when in the engaged condition. The clutch 12 does not transmit rotation of the output shaft of the second gear 24 to the third gear 28 when in the disengaged condition. The clutch 12 is in the engaged condition when the torque applied to the output shaft of the second gear 24 is below a predetermined value. The clutch 12 moves to the disengaged condition when the torque applied to the output shaft of the second gear 24 is above the predetermined value. In this way, the clutch 12 helps prevent a large torque from being applied to the third gear that could damage the third gear.

The clutch 12 may also provide a dwell in the steering system 10. The clutch 12 may only transmit rotation of the output shaft of the second gear 24 to the third gear 26 after the output shaft of the second gear has rotated through a predetermined angle. Therefore, the third and fourth gears 26, 28 are only actuatable after the front steering linkage has moved a desired amount. Thus, the rear steering linkage 20 only moves after the front steering linkage 18 moves a predetermined amount. Typically, it desired that the rear steering linkage 20 does not move until the front set 14 of steerable wheels are turned a predetermined angle from a straight ahead or initial position, such as when a parking maneuver is being performed. Thus, the rear set 16 of steerable wheels are not turned during an initial turning of the front set 14 of steerable wheels from a straight ahead position.

Figure 2:
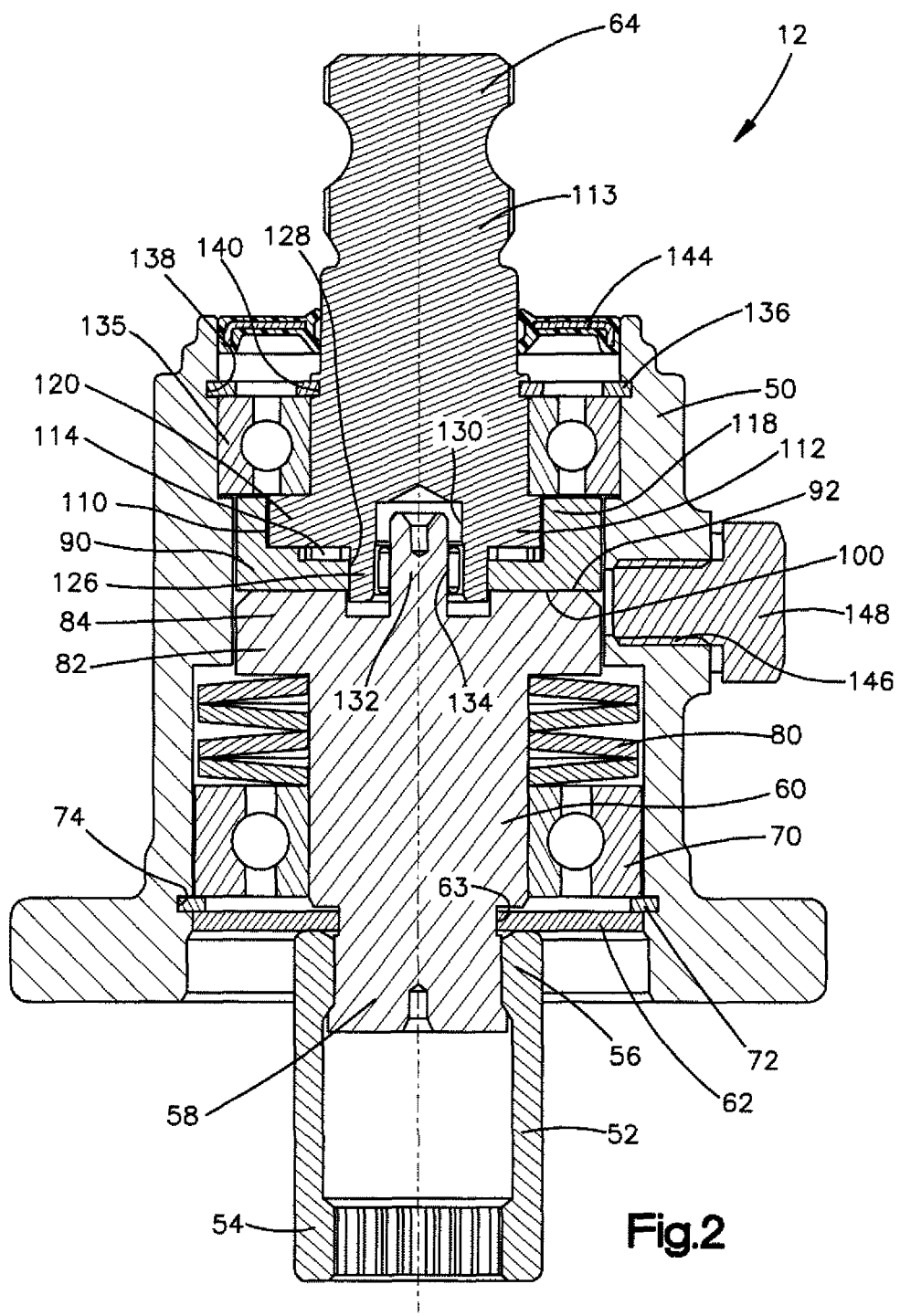
FIG. 2 is a schematic sectional view of the steering gear clutch of FIG. 1.

The steering gear clutch 12 (FIG. 2) includes a housing 50. The housing 50 may be connected to the second gear 24 in any desired manner. It is contemplated that the housing 50 may be connected to the second gear 24, a frame of the vehicle 13, or the third gear 26.

The housing 50 rotatably supports a coupling sleeve 52. The coupling sleeve 52 has a first end 54 connectable with the output shaft of the second or back drive gear 24 so that the coupling sleeve rotates with the output shaft of the second gear. The coupling sleeve 52 has a second end 56 connected to a first end 58 of an input shaft 60. The second end 56 of the coupling sleeve 52 may have a splined connection with the first end 58 of the input shaft 60 so that the input shaft rotates with the coupling sleeve. The splined connection also allows the input shaft 60 to move axially relative to the coupling sleeve 52. A washer 62 extends into a groove 63 in the input shaft 60 to limit axial movement of the input shaft relative to the coupling sleeve 52 and the housing 50. The clutch 12 has an output shaft 64 operatively connected with the shaft 42 connected to the third or drive gear 26.

The input shaft 60 is rotatably supported in the housing 50 by bearings 70. The bearings 70 may be held in the housing 50 by a snap ring 72. The snap ring 72 extends into a groove 74 in the housing 50 and engages the bearings 70 to retain the bearings in the housing.

At least one spring 80 urges the input shaft 60 axially toward the output shaft 64. The springs 80 engage the bearings 70 and a radially extending flange 82 on a second end portion 84 of the input shaft 60. The springs 80 urge the second end portion 84 of the input shaft 60 into engagement with a dog disc 90 of the output shaft 64. The clutch 12 is shown as having four spring washers 80 urging the input shaft into engagement with the dog disc 90. It is contemplated that any number or type of spring may be used.

An axial end surface 92 (FIG. 3) of the flange 82 has a first set of radially extending teeth 96 and a second set of radially extending teeth 98. The first and second sets of teeth 96, 98 are circumferentially spaced from each other. The first set of teeth 96 is located radially opposite from the second set of teeth 98. It is contemplated that the first set of teeth 96 may be spaced circumferentially any desired distance from the second set of teeth 98. Each set of teeth 96 and 98 includes three teeth. Although only two sets of teeth 96, 98 are shown, the axial end surface 92 may have any desired number of sets of teeth. Furthermore, each set of teeth may have any desired number of teeth.

An axial end surface 100 (FIG. 4) of the dog disc 90 has a first set of radially extending grooves 102 and a second set of radially extending grooves 104. Each of the first and second sets of grooves 102 and 104 has the same number of grooves as the first and second sets of teeth 96, 98. The first set of grooves 102 normally receives the first set of teeth 96 on the input shaft 60. The second set of grooves 104 normally receives the second set of teeth 98 on the input shaft 60. Therefore, when the first and second sets of teeth 96, 98 are located in the first and second sets of grooves 102, 104, the input shaft 60 and the dog disc 90 may rotate together. If the first and second sets of teeth 96, 98 are not received in the first and second sets of grooves 102, 104 then the input shaft 60 and the dog disc 90 may rotate relative to each other. Although, the input shaft 60 is shown as having sets of teeth 96, 98 and the dog disc 90 is shown as having sets of grooves 102, 104, it is contemplated that the input shaft may have grooves that mesh with teeth on the dog disc.

The first and second sets of grooves 102, 104 are circumferentially spaced from each other. The first set of grooves 102 is located radially opposite from the second set of grooves 104. It is contemplated that the first set of grooves 102 may be spaced circumferentially any desired distance from the second set of grooves 104. Each set of grooves 102 and 104 includes three grooves. Although only two sets of grooves 102, 104 are shown, the axial end surface 100 of the dog disc 90 may have any desired number of sets of grooves. Furthermore, each set of grooves may have any desired number of grooves.

The springs 80 urge the first and second sets of teeth 96, 98 into meshing engagement with the first and second sets grooves 102, 104. When the toque applied to the input shaft 60 is below the predetermined value, the force applied by the springs 80 is large enough to hold the first and second sets of teeth 96, 98 in meshing engagement with the first and second sets of grooves 102, 104. When the torque applied to the input shaft 60 is above the predetermined value, the force applied by the springs 80 is not large enough to hold the first and second sets of teeth 96, 98 in meshing engagement with the first and second sets of grooves 102, 104. When the torque applied to the input shaft 60 is above the predetermined value, the input shaft 60 rotates relative to the dog disc 90 of the input shaft 64 and moves axially away from the dog disc to compress the springs 80. Once the first and second sets of teeth 96, 98 are aligned with the first and second sets of grooves 102, 104, the first and second sets of teeth mesh with the first and second sets of grooves so that the input shaft 60 and the dog disc 90 may rotate together relative to the housing 50.

The dog disc 90 of the output shaft 64 (FIGS. 2 and 3) includes a recess 110. A first end 112 of a shaft portion 113 of the output shaft 64 extends into the recess 110. Bearings 114 (FIG. 2), such as needle thrust bearings, support the dog disc 90 for rotation relative to the shaft portion 113 of the output shaft 64.

The dog disc 90 (FIGS. 2 and 3) includes a radially inwardly extending projection or dog 118. The radially inwardly extending projection 118 may engage a radially outwardly extending projection or dog 120 on the first end 112 of the shaft portion 113. When the projection 118 on the dog disc 90 engages the projection 120 on the shaft portion 113, the dog disc and the shaft portion 113 rotate together relative to the housing 50. If the projections 118 and 120 are spaced circumferentially from each other, then the dog disc 90 rotates relative to the shaft portion 113. The dog disc 90 does not transmit rotation of the input shaft 60 to the shaft portion 113 when the projections 118, 120 are spaced from each other. The projection 118 is circumferentially spaced from the projection 120 when the first set 14 of steerable wheels are in a straight ahead or initial position so that the vehicle 13 does not turn.

The shaft portion 113 of the output shaft 64 (FIG. 2) includes an axially extending projection 126. The axially extending projection 126 extends through an opening 128 in the dog disc 90. The axially extending projection 126 includes an axially extending recess 130. An axially extending projection 132 on the input shaft 60 extends into the recess 130 and through the opening 128. Bearings 134 located in the recess 130 engage the projection 132 to support the input shaft 60 and the shaft portion 113 for rotation relative to each other.

The shaft portion 113 of the output shaft 64 is rotatably supported in the housing 50 by bearings 135. The bearings 135 are held in the housing 50 by a snap ring 136 extending into a groove 138 in the housing. The snap ring 136 also extends into a groove 140 in shaft portion 113.

A seal 144 may extend between the shaft portion 113 of the output shaft 64 and the housing 50 to retain lubricant in the housing. The housing 50 may include a port 146. The port 146 may be used for filling the housing 50 with lubricant and/or for inspection of the interface between the input shaft 62 and the dog disc 90. A plug 148 threadably engages the housing 50 to close the port 146.

In operation, the first or master steering gear 22 is actuated in response to rotation of the vehicle steering wheel 34. Actuation of the first steering gear 22 effects movement of the front steering linkage 18 to turn the front set 14 of steerable wheels. The second or back drive gear 24 is also actuated in response to rotation of the steering wheel 34.

Actuation of the second or back drive gear 24 effects rotation of the output shaft (not shown) of the second gear. The coupling sleeve 52 and the input shaft 60 of the clutch 12 rotate with the output shaft of the second gear. It the torque applied to the input shaft 60 is below a predetermined value, the first and second sets of teeth 96, 98 on the input shaft remain in meshing engagement with the first and second sets of grooves 102, 104 on the dog disc 90. The force applied by the springs 80 retain the first and second sets of teeth 96, 98 in the first and second sets of grooves 102, 104. The dog disc 90 rotates with the input shaft 60 when the torque is below the predetermined value.

The input shaft 60 and the dog disc 90 rotate together relative to the shaft portion 113 of the output shaft 64 and the housing 50 if the projection 118 on the dog disc is spaced from the projection 120 on the output shaft. The rotation of the input shaft 60 and the dog disc 90 relative to the shaft portion 113 of the output shaft 64 prevents the third or drive gear 26 from being actuated. Therefore, the shaft portion 113 of the output shaft 64 does not rotate until the input shaft 60 rotates through a desired angle and the projection 118 on the dog disc 90 engages the projection 120 on the shaft portion 113. The desired angle may be between 120 degrees and 140 degrees and is approximately 130 degrees. The spacing of the projections 118 and 120 provides a dwell in which the third gear 26 does not actuate and the rear set 16 of steerable wheels. Thus, the third gear is not actuated until the first set 14 of steerable wheels have turned a desired angle.

When the projection 118 on the dog disc 90 engages the projection 120 on the shaft portion 113 of the output shaft 64, the shaft portion rotates together with the input shaft 60 and the dog disc 90 relative to the housing 50. The shaft 42 rotates in response to rotation of the shaft portion 113 of the output shaft 64. The third or drive gear 26 and the fourth or slave gear are actuated in response to rotation of the shaft 42 to turn the rear set 16 of steerable wheels. It is contemplated that a ratio change box (not shown) may interconnect the output shaft 64 of the clutch 12 and the shaft 42. The ratio change box may change the gear ratio between the output shaft 64 and the shaft 42.

If the torque applied to the input shaft 60 is greater that the predetermined value, the input shaft rotates relative to the dog disc 90 to prevent damage to third or drive gear 26. The first and second sets of teeth 96, 98 move out of the first and second sets of grooves 102, 104 on the dog disc. The input shaft 60 moves axially away from the output shaft 64 relative to the dog disc 90 and the housing 50. Upon axial movement of the input shaft 60, the springs 80 are compressed further.

The input shaft 60 may rotate approximately 180 degrees relative to the dog disc 90 until the first set of teeth 96 meshingly engage the second set of grooves 104 and the second set of teeth 98 meshingly engage the first set of grooves 102. If the torque applied to the input shaft 60 is below the predetermined value when the first set of teeth 96 are aligned with the second set of grooves 104, then the first and second sets of teeth 96, 98 will meshingly engage the second and first sets of grooves 104, 102, respectively. The shaft portion 113 of the output shaft 64 will then rotate together with the dog disc 90 and the input shaft 60. The operator of the vehicle will sense that the movement of the rear set 16 of steerable wheels is not as it should be to give notice that there is a problem with the steering system 10. Once the operator is aware of a problem, the steering system 10 can be looked at to correct any problems.

It is contemplated that the dwell may not be necessary. If the dwell is not necessary, the first and second sets of grooves 102 and 104 may be formed on an axial end surface of the shaft portion 113 of the output shaft 64 and the dog disc 90 would be eliminated.

From the above description of the invention, those skilled in the art will perceive improvements, changes and modifications. Such improvements, changes and modifications within the skill of the art are intended to be covered by the appended claims.

Having described the invention, the following is claimed:

1. A steering gear clutch comprising:
a housing;
an input shaft rotatably supported by the housing and operatively connected to a first steering gear;
an output shaft having a shaft portion operatively connected to a second steering gear, the shaft portion being rotatably supported by the housing, the shaft portion being rotatable relative to the input shaft;
the input shaft being rotatable relative to the shaft portion and the housing through a predetermined angle, the input shaft and the shaft portion rotating together relative to the housing when the input shaft has rotated relative to the housing the predetermined angle;
the input shaft rotating together with the shaft portion relative to the housing when a torque below a predetermined value is applied to the input shaft and the input shaft has rotated the predetermined angle relative to the housing, the input shaft rotating relative to the shaft portion and the housing when a torque above the predetermined value is applied to the input shaft, the input shaft moving axially relative to the output shaft and the housing when the torque applied to the input shaft is above the predetermined value.

2. A steering gear clutch as set forth in claim 1 wherein at least one spring urges the input shaft axially toward the output shaft, the input shaft moving axially away from the output shaft when the torque applied to the input shaft is above the predetermined value.

3. A steering gear clutch as set forth in claim 1 wherein the input shaft engages the output shaft to transmit rotation of the input shaft to the output shaft when the torque applied to the input shaft is below the predetermined value.

4. A steering gear clutch as set forth in claim 1 wherein the output shaft includes a dog disc, the dog disc engaging the input shaft, the dog disc being rotatable relative to the housing, the input shaft and the shaft portion, the dog disc rotating with the input shaft relative to the housing and the shaft portion when the input shaft has rotated an angle below the predetermined angle relative to the housing.

5. A steering gear clutch as set forth in claim 4 wherein the dog disc includes a radially extending projection engageable with a radially extending projection on the shaft portion, the dog disc rotating with the shaft portion relative to the housing when the radially extending projections engage each other.

6. A steering gear clutch comprising:
   a housing;
   an input shaft rotatably supported by the housing and operatively connected to a first steering gear;
   an output shaft having a shaft portion operatively connected to a second steering gear, the shaft portion being rotatably supported by the housing, the shaft portion being rotatable relative to the input shaft;
   the input shaft being rotatable relative to the shaft portion and the housing through a predetermined angle, the input shaft and the shaft portion rotating together relative to the housing when the input shaft has rotated relative to the housing the predetermined angle;
   the input shaft rotating together with the shaft portion relative to the housing when a torque below a predetermined value is applied to the input shaft and the input shaft has rotated the predetermined angle relative to the housing, the input shaft rotating relative to the shaft portion and the housing when a torque above the predetermined value is applied to the input shaft;
   the input shaft engaging the output shaft to transmit rotation of the input shaft to the output shaft when the torque applied to the input shaft is below the predetermined value;
   one of the input shaft and the output shaft having teeth engaging grooves on the other of the input shaft and the output shaft when the torque applied to the input shaft is below a predetermined value.

\* \* \* \* \*